Nov. 27, 1956

G. C. CROWLEY 2,772,338

HEATING DEVICE CONTROL CIRCUIT

Filed Dec. 30, 1954

*Inventor:*
*George C. Crowley,*
*by Frank L. Neuhauser*
*His Attorney.*

United States Patent Office 2,772,338
Patented Nov. 27, 1956

2,772,338

HEATING DEVICE CONTROL CIRCUIT

George C. Crowley, Asheboro, N. C., assignor to General Electric Company, a corporation of New York Application December 30, 1954, Serial No. 478,842

6 Claims. (Cl. 219—20)

My invention relates to improvements in electric circuits and controls therefor, and more particularly to improvements in circuits and controls for heating devices, such as heating pads and the like.

In various devices it is desirable to obtain selectively several temperature settings. By way of example, in heating pads it is customary to provide a plurality of different settings by which the pad may be operated at any one of several selected temperatures. This is sometimes accomplished by providing a heater adjacent the controlling thermostat and varying the current to the heater so as to vary the amount of heat supplied thereby to the thermostat. In this way the temperature of the heating pad at which the thermostat heater raises the temperature of the control thermostat to its cut-off point may be varied.

In accordance with my invention a circuit is provided in connection with the thermostat heater whereby the energy to the heater may be widely varied so as to obtain a wide spread between the temperatures at which the heating device may be set.

It is an object of my invention to provide a heating device and a control therefor whereby a plurality of different temperature settings of the heating device may be secured.

It is another object of my invention to provide a heating device and control therefor whereby a wide range of temperature settings of the heating device may be secured.

It is a further object of my invention to provide a heating device and a control therefor in which a ballast resistor forming part of the control circuit is arranged to be located outside the confines of the heating device itself, that is remote from the heating device.

Other objects and advantages of my invention will become apparent as the following description proceeds and the features of novelty which characterize my invention will be pointed out with particularity in the claims annexed to and forming part of this specification.

For a better understanding of my invention reference may be had to the accompanying drawing in which Fig. 1 is a schematic wiring diagram of an embodiment of my invention applied to a heating pad.

In carrying out the objects of my invention, a ballast resistor is incorporated in the electrical circuit. A control is provided remote from the heating device and arranged so that in one position of the control a heater for the control thermostat is connected across the ballast resistor and a section of the heating element in series; in a second position the ballast resistor is shorted and the thermostat heater alone is connected across this section of the heating element; and in a third position the thermostat heater and ballast resistor in series are connected across this section of the heating element. The ballast resistor is arranged in the control housing or in the line connecting the control to the heating device.

While it will be obvious as the description proceeds that my invention is applicable to a wide range of heating devices, for convenience it will be described in connection with one specific application, mainly the controlling of the temperature of a heating pad.

Figure 1:
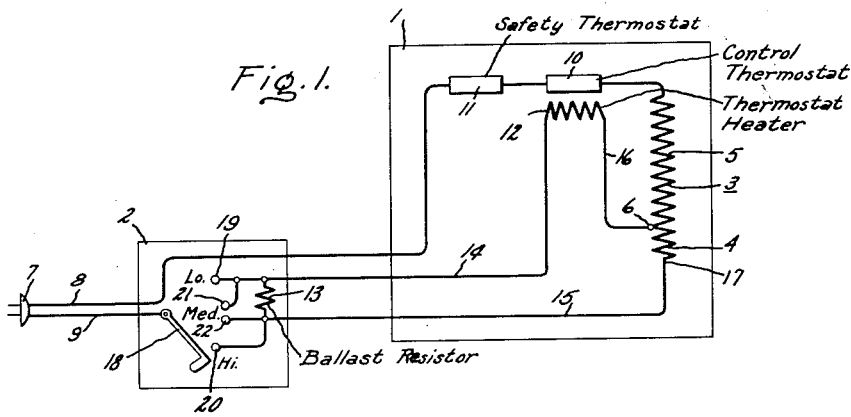

Referring to Fig. 1 of the drawing, the heating pad is indicated diagrammatically by the rectangle 1 and the control or selector switch is indicated diagrammatically by the rectangle 2. The heating pad includes a heating element 3 which is formed of a first section 4 and a second section 5. Actually in normal practice the heating element would be formed of one continuous resistance element, a tap simply being provided at the point 6 common to the sections 4 and 5 for affording connection of other portions of the circuit in accordance with my invention. In the diagrammatic illustration employed, heating element for convenience has been shown merely extending along one edge of the pad, but it will be obvious that in actual practice the heating element would be distributed in any suitable manner over the entire area of the pad.

Power is supplied to the heating element from any suitable power source through a plug 7 and lines 8 and 9. The heating pad includes two thermostats 10 and 11. The thermostat 10 is the control thermostat which governs the temperature of the heating pad, and the thermostat 11 is an over-temperature or safety thermostat to insure against any undesirably high temperature in the heating pad.

In order to vary the temperature of the heating pad by altering the response of the control thermostat 10, a thermostat heater 12 is provided generally adjacent the control thermostat 10. Preferably this thermostat heater is wrapped directly around the bimetallic strip or other temperature sensitive portion of the thermostat.

The control circuit includes a ballast resistor 13, which in the form of invention illustrated in Fig. 1 is located within the housing of the control; this housing may be generally regarded as outlined by the rectangle 2. By this arrangement heat generated in the ballast resistor cannot affect the control thermostat or the heating pad. One end of the ballast resistor 13 is connected by a line or wire 14 to one side of the thermostat heater 12. The other end of the ballast resistor is connected by a line or wire 15 to one end 17 of the heating element 3, and specifically to the end of the section 4 thereof. The other end of the thermostat heater is connected by a line 16 to the common point 6 at the junction between sections 4 and 5 of the heating element. It can be seen from the above description that the ballast resistor 13 is disposed remote from the heating pad 1. In the specific embodiment shown in Fig. 1 this ballast resistor is actually disposed in the housing of the control but, as used in the specification and claims, it is intended that remote from the heating pad or other heating device indicate a position outside the immediate confines of the heating pad whether it be within the control housing or in the line connecting the control housing to the heating pad or other heating device. While only a short length of cord or lead between the control housing and the heating pad is indicated in the diagrammatic representation in Fig. 1, it will be apparent that a cord of substantial length will normally be provided to make the device flexibly suitable for various purposes for which it may be used.

In order to control the connection of the thermostat heater and the ballast resistor in the circuit in a plurality of combinations, a control indicated generally by the rectangle 2, is provided. This control includes a selector switch having a manually movable switch arm, indicated diagrammatically at 18. The switch arm 18 may be moved to any of three different temperature positions indicated respectively by the legends "Lo," "Med," and "Hi" in Fig. 1. Normally a fourth, or "Off," position is also provided.

The low temperature terminal 19 of the switch is connected by the line 14 to one side of the ballast resistor 13 and to one side of the thermostat heater 12. The high temperature terminal 20 is connected by the line 15 to the end 17 of the section 4 of the heating element 3. The medium temperature position includes two terminals 21 and 22. The terminal 21 is connected to the line 14 which, as indicated above, also extends to the low temperature terminal 19. The terminal 22 of the medium temperature position is connected to the line 15 which, as indicated above, also extends to the high temperature terminal 20.

Figure 2:
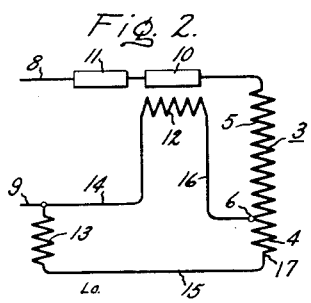
Fig. 2 is a simplified diagram showing the active portions of the circuit at the low temperature setting.
Figure 3:
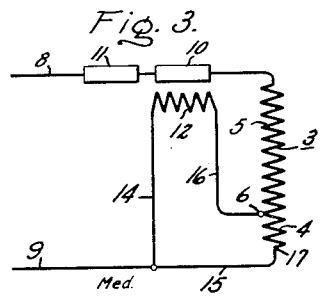
Fig. 3 is a simplified diagram showing the active portions of the circuit at the medium temperature setting.
Figure 4:
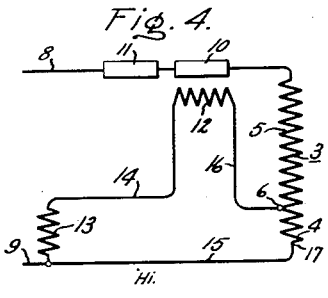
Fig. 4 is a simplified diagram showing the active portions of the circuit at the high temperature setting.

For simplicity in explaining the operation of the heating pad and its control, the active portions of this circuit in the low, medium and high temperature positions of the switch are shown in Figs. 2, 3 and 4 respectively. Thus, referring to the low temperature circuit shown in Fig. 2, the line 8 is connected to the safety thermostat 11 and thence to the control thermostat 10 and thence to one end of the heating element 3. The line 14 is connected to one side of the thermostat heater 12 and the other side of the thermostat heater is connected to the junction point 6 between the sections 4 and 5 of the heating element 3. The line 15 is connected to the end 17 of the section 4 of the heating element. The ballast resistor is connected between the lines 14 and 15, this connection, as indicated above, being remote from the heating pad 1. In this position of the control, therefore, as clearly shown in Fig. 2, the thermostat heater 12 is connected across a series circuit composed of the ballast resistor 13 and the section 4 of the heating element. This allows a predetermined current to flow through the thermostat heater 12, ultimately causing the temperature of the control thermostat 10 to rise to its cut-off point at a particular temperature of the heating pad.

The active portions of the circuit in the medium temperature position are shown in Fig. 3. With the switch in the medium temperature position, the line 9 is connected through the terminal 21 and the line 14 to one side of the thermostat heater 12. The line 9 is further connected through the terminal 22 and the line 15 to the end 17 of the section 4 of the heating element 3. It can be seen that the medium temperature position of the switch shorts the ballast resistor 13 and thereby eliminates this resistor from the circuit. Accordingly, as shown in Fig. 3, in the medium temperature setting, the thermostat heater is connected across the section 4 of the heating element 3. In the circuit arrangement shown in Fig. 3, a smaller current is supplied to the thermostat heater 12 and accordingly a substantially higher temperature of the heating pad is reached before the control thermostat is brought to the cut-off temperature.

The high temperature setting is illustrated in Fig. 4. Under this circuit condition, the ballast resistor 13 and thermostat heater 12 are connected in series across the section 4 of the heating element 3. This still further reduces the current applied to the thermostat heater 12 so that a further substantially higher temperature of the heating pad is reached before the control thermostat 10 is brought to its cut-off temperature.

By way of example, in one form of my invention I have employed circuit elements having the following resistance values:

| | Ohms |
|---|---|
| Heating element portion 4 | 36 |
| Heating element portion 5 | 188 |
| Ballast resistor 13 | 55 |
| Thermostat heater 12 | 40 |

Again in the particular example given, using the resistance values set forth above, I was able to obtain temperatures of approximately 135° F., 152° F. and 170° F. at the low, medium and high temperature settings, respectively. Thus a substantial spread in temperatures between the three settings is obtained by the circuit of my invention.

Figure 5:
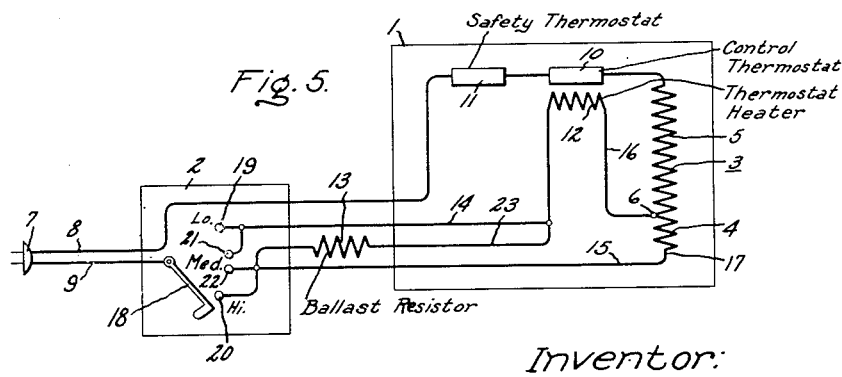
Fig. 5 is a schematic wiring diagram of a modified form of my invention.

In Fig. 5 there is shown a modified form of my invention. The circuit shown in Fig. 5 differs from that described above only in the specific location of the ballast resistor, and the same numerals have been applied to corresponding parts in Figs. 1 and 5. In the modification shown in Fig. 5 the ballast resistor 13, instead of being located within the housing of the control as in the form previously described, is located in the line or cord extending between the control and the heating pad. From a circuit connection standpoint, the ballast resistor is connected at one end to the line 15 as in the form shown in Fig. 1 and at the other end to the line 14, also as in the form shown in Fig. 1. The connection between lines 14 and 15 is provided by a line 23. It will be apparent that the lines 8, 13, 14 and 23 will in normal practice be combined in a single cord or lead extending from the control indicated by the rectangle 2 to the heating pad indicated by the rectangle 1. In the form shown in Fig. 5 it will be seen that the cord connecting the control in the heating pad is a four-wire cord in lieu of the three-wire cord which suffices in the form shown in Fig. 1.

The circuit connections of the various circuit elements at the low, medium and high temperature settings for the form shown in Fig. 5 are identical to those for the form shown in Fig. 1 and hence are represented equally well by the simplified wiring diagrams shown in Figs. 2, 3 and 4.

While I have shown and described specific embodiments of my invention, I do not desire my invention to be limited to the particular construction shown and described and I intend by the appended claims to cover all modifications within the spirit and scope of my invention.

What I claim as new and desire to secure by Letters Patent of the United States is:

1. A heating device and a control for varying the temperature of said heating device, comprising means for connecting said control to said heating device, said heating device including a heating element having a first section and a second section, a thermostat for controlling said heating element, a thermostat heater for said thermostat, one end of said thermostat heater being connected to said heating element at the common point of said sections, a ballast resistor connected between the other end of said thermostat heater and said first section of said heating element, said ballast resistor being disposed remote from said heating device, said control being movable to a low heat position for connecting said thermostat heater across the series circuit of said ballast resistor and said first section of said heating element, movable to a medium heat position for connecting said thermostat heater across only said first heater section, and movable to a high heat position for connecting the series circuit of said thermostat heater and said ballast resistor across said first section of said heating element, said circuits in all positions of said control being completed through said second section of said heating element.

2. The combination of claim 1 wherein said means for connecting said control to said heating device includes two wires and said ballast resistor is connected between said wires.

3. The combination of claim 1 wherein said control includes a housing and said ballast resistor is disposed within said housing.

4. A heating device and a control switch for varying the temperature of said heating device, comprising a heating element having a first section and a second section, a thermostat for controlling said heating element, a thermostat heater for said thermostat, one end of said thermostat heater being connected to said heating element at the common point of said sections, a ballast resistor disposed remote from said heating device, circuits interconnecting said control switch with said heating element sections and with said ballast resistor and thermostat heater, said control switch being movable to a low heat position for a circuit with said thermostat heater in electrical parallel with the series combination of said ballast resistor and said first section of said heating element, movable to a medium heat position for a circuit with said thermostat heater alone in electrical parallel with said first section of said heating element, and movable to a high heat position for a circuit with the series combination of said thermostat heater and said ballast resistor in electrical parallel with said first section of said heating element, said circuits in all positions of said control switch being completed to the electrical supply source through said second heating element section.

5. A heating device and a control for varying the temperature of said heating device, comprising a heating element having a first section and a second section, a thermostat for controlling said heating element, a thermostat heater for said thermostat, one end of said thermostat heater being connected to said heating element at the common point of said sections, a ballast resistor disposed remote from said heating device, a control switch disposed remote from said heating device, and circuit means interconnecting said heating element sections with said control switch and with said ballast resistor and thermostat heater, said control being movable to a low heat position for a circuit with said thermostat heater across the series combination of said ballast resistor and said first section of said heating element, movable to a medium heat position for shorting said ballast resistor from said low heat circuit, and movable to a high heat position for a circuit with said thermostat heater and said ballast resistor in series across said first section of said heating element.

6. A heating device and a control switch for varying the temperature of said heating device, comprising means for connecting said switch to said heating device, said heating device including a heating element having a first section and a second section, a thermostat for controlling said heating element, a thermostat heater for said thermostat, one end of said thermostat heater being connected to said heating element at the common point of said sections, a ballast resistor connected between the other end of said thermostat heater and said first section of said heating element, said ballast resistor being disposed remote from said heating device, said switch being movable between one position in which said thermostat heater is connected across said ballast resistor and said first section of said heating element in series, a second position in which said thermostat heater and said ballast resistor in series are connected across said first section of said heating element, and a third position in which said thermostat heater is connected across said first section of said heating element.

References Cited in the file of this patent

UNITED STATES PATENTS

| | | |
|---|---|---|
| 2,024,153 | Eskin | Dec. 17, 1935 |
| 2,400,735 | Bradford | May 21, 1946 |
| 2,579,926 | Wise | Dec. 25, 1951 |
| 2,705,276 | Wise | Mar. 29, 1955 |